Sept. 25, 1923.  1,468,975
H. J. RALSTON
TRAILER OPERATING MECHANISM
Filed Sept. 20, 1919
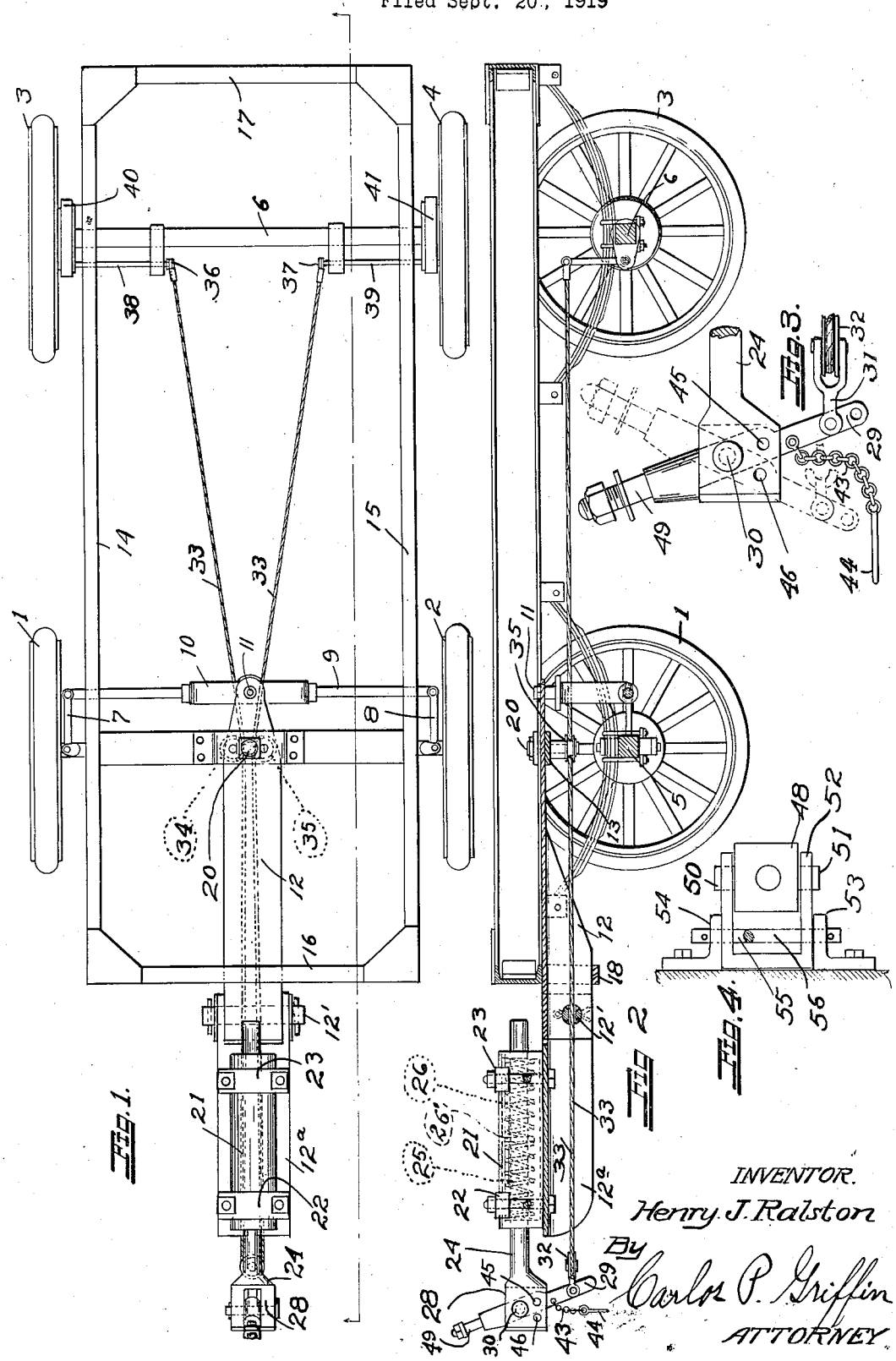
INVENTOR.
Henry J. Ralston
By
Carlos P. Griffin
ATTORNEY Patented Sept. 25, 1923.

1,468,975

UNITED STATES PATENT OFFICE.

HENRY J. RALSTON, OF SAN FRANCISCO, CALIFORNIA.

TRAILER OPERATING MECHANISM.

Application filed September 20, 1919. Serial No. 325,262.

*To all whom it may concern:*

Be it known that I, HENRY J. RALSTON, a citizen of the United States, residing at San Francisco, in the county of San Francisco, State of California, have invented a new and useful Trailer Operating Mechanism, of which the following is a specification in such full and clear terms as will enable those skilled in the art to construct and use the same.

This invention relates to a trailer for trucks and its object is to provide a plate for preventing the trailer from running against the truck hauling it too heavily.

Another object of the invention is to provide for the automatic operation of the trailer brake through the operation of the trailer and truck itself, means being provided for operating the trailer brake each time the trailer happens to run ahead of its normal running position with respect to the truck hauling it.

Another object of the invention is to provide means whereby the trailer may be so connected to the truck which hauls it as to permit it to be readily detached therefrom, and to provide a practically universal connection with the truck, thereby enabling the truck and trailer to travel over uneven ground or roads without injury to the driving connections.

Other objects of the invention will appear as the description proceeds.

An embodiment of the invention is shown in the drawings in which the same reference numeral is applied to the same portion throughout, but I am aware that there may be modifications thereof.

Fig. 1 is a plan view of the trailer,

Fig. 2 is a vertical sectional view of the trailer showing the application of the brake thereto, Fig. 3 is an enlarged detailed view of the pin for connecting the trailer steering mechanism to the truck, and Fig. 4 is a plan view of the means for connecting the end of the trailer draw bar to the truck which drives it.

The wheels are indicated by the numerals 1 to 4 inclusive, 5 and 6 indicating the front and rear axles respectively. The front wheels are steered by means of the usual steering arms 7 and 8 which are connected to a drag link 9, and this drag link is in turn connected by means of a pin 11 with a steering bar or draw bar 12.

The draw bar 12 is pivotally mounted on a transverse frame member 13 connected at its ends to the side rails 14 and 15 forming the frame of the vehicle, said side rails being connected at their ends by means of transverse members 16 and 17. The draw bar 12 is held up against the frame member 16 by means of a separate bar 18 which permits it to move laterally as much as may be necessary to effect the steering of the vehicle.

The draw bar 12 has a transverse pin 12' at its forward end which connects it with the front draw bar 12$^a$ which latter can move vertically on said pin 12'.

The front bar 12$^a$ carries a housing 21 at its front end which is secured thereto by bolts passing through two yokes 22, 23, and through which casing the movable draw bar 24 passes. Spiral springs 25, 26 within the housing 21 afford the necessary movement to the draw bar to prevent injury to the vehicle frame of the brake or to the trailer.

At the front end of the longitudinally movable draw bar 24 is a yoke 28 which has a lever 29 mounted therein and pivoted on a pin 30. This lever is connected to the truck for hauling it at its upper end, and at its lower end it is connected to a clevis 31, which clevis carries a pulley 32 around which a cable 33 passes.

The cable 33 extends rearwardly from the lever 29 through two holes in the pin 12' and between two pulleys 34, 35 which are positioned so as to bring the two strands of the cable as nearly under the center of the pin 20 as possible from which point the cable extends to the brake levers 36, 37 on the brake operating rods 38, 39. Said rods operate the brakes within the drums 40, 41 of any well known form.

In order to connect the lever 29 with the tractor or truck, a block 48 is provided, which block has an opening to receive the shank 49 on the upper end of the lever 29. This block has two pins 50, 51 forged thereon, which pass through holes in a clevis 52 and said clevis is rigidly connected with the two rearwardly extending brackets 53, 54, which are secured to the truck or tractor by means of two pins 55, 56 and which pins when removed permit the trailer to be separated from the truck without removing the nut on the upper end of the shank 49.

If the tractor is to be operated over level ground, it may be desirable to insert a pin 44 in the rear opening 45 and thereby prevent the application of the brake. Ordinarily, however, this is not necessary; but if the truck stops upon a downward slope, the brake will be applied and if it is desired to leave the trailer behind, the pin 44 may be inserted in the hole 46 and the lever will, in that position, apply the brake and the trailer may be left with safety.

In operation, as the trailer is hauled ahead by a suitable connection with the upper end of the lever 29, the cable 33 will be slackened; while as soon as the trailer tends to run ahead of its normal position, the upper end of the lever 29 will be pushed back as indicated in the dotted lines, Fig. 3, and the cable will be tightened thereby applying the brakes and tending to slow the trailer down and prevent it from running into the truck too heavily. It will be understood that the trailer frame is supported by any suitable type of springs.

In order to prevent the brake from being applied when running on level ground or to hold the brake applied when that may be desired, the lever 29 has a small chain 43 attached thereto, which chain has a pin 44 adapted to be applied in either the holes 45 or 46, as may be desired.

What I claim is as follows, but various modifications may be made in the construction shown in the drawings and above particularly described form, within the purview of my invention.

1. In a trailer brake mechanism for a wheeled trailer having brake drums, shoes and operating levers associated with one set of wheels, the combination of a draw-bar pivoted on the trailer frame to move laterally, a front draw-bar pivoted on the first draw-bar to move vertically, a lever pivoted on the front end of the latter draw-bar for hauling the trailer, a cable connected with the lower end of the latter lever and with the brake levers and means associated with each draw-bar pivot for holding the cable in a constant relation with respect to the braking apparatus upon lateral and vertical movements of the draw-bar.

2. In a trailer brake operating mechanism for a wheeled trailer having brake drums, shoes and operating levers associated with one set of wheels, the combination of a draw-bar pivoted on the trailer frame to move laterally, a second draw-bar pivoted on the front end of the first draw-bar to move vertically, a lever at the front end of the latter draw-bar for hauling the trailer, a cable connected with said lever and with the brake levers and means associated with each draw-bar pivot to permit the movement of the draw-bars without disturbing the relationship of the cable and braking apparatus upon lateral or vertical movements of the draw-bars.

3. In a trailer brake operating mechanism for a wheeled trailer having brake drums, shoes and operating levers associated with one set of wheels, the combination of a draw-bar pivoted on the trailer frame to move laterally, a second draw-bar pivoted on the first draw-bar and adapted to move vertically, a lever pivoted on the latter draw-bar at its front end for hauling the trailer, a cable connected with said lever and connected with the brake operating levers, means associated with each draw-bar pivot to hold the cable in a given relation to the brake apparatus upon lateral and vertical movements of the draw-bar and means to hold the cable operating lever in such a position as to hold the brakes on or off as may be desired.

In testimony whereof I have hereunto set my hand this 5" day of September A. D. 1919.

HENRY J. RALSTON.